(12) United States Patent
Limaye et al.

(10) Patent No.: US 7,145,882 B2
(45) Date of Patent: Dec. 5, 2006

(54) MULTIPLEXED AUTOMATIC PROTECTION SWITCHING CHANNELS

(75) Inventors: Pradeep Shrikrishna Limaye, Westfield, NJ (US); Heena Nandu, Sunnyvale, CA (US); Srinivasan Murari, Freemont, CA (US)

(73) Assignee: Bay Microsystems, Inc., San Jose, CA (US)

( * ) Notice: Subject to any disclaimer, the term of this patent is extended or adjusted under 35 U.S.C. 154(b) by 989 days.

(21) Appl. No.: 10/116,418

(22) Filed: Apr. 4, 2002

(65) Prior Publication Data
US 2003/0189895 A1    Oct. 9, 2003

(51) Int. Cl.
*H04L 12/28* (2006.01)
(52) U.S. Cl. .................... 370/258; 370/216
(58) Field of Classification Search ............... 370/258, 370/222, 223, 392, 535, 537
See application file for complete search history.

(56) References Cited

U.S. PATENT DOCUMENTS

| | | | |
|---|---|---|---|
| 5,179,548 A * | 1/1993 | Sandesara | 370/222 |
| 5,327,427 A * | 7/1994 | Sandesara | 370/222 |
| 5,365,510 A | 11/1994 | Nicholson | |
| 5,412,652 A * | 5/1995 | Lu | 370/223 |
| 5,815,490 A * | 9/1998 | Lu | 370/223 |
| 6,169,754 B1 * | 1/2001 | Sugawara et al. | 370/535 |
| 6,212,161 B1 * | 4/2001 | Regula | 370/223 |
| 6,349,092 B1 * | 2/2002 | Bisson et al. | 370/258 |
| 6,944,157 B1 * | 9/2005 | Betta et al. | 370/392 |

\* cited by examiner

*Primary Examiner*—Hassan Kizou
*Assistant Examiner*—Albert T. Chou

(57) ABSTRACT

An apparatus and method that extend the automatic protection switching protocol to address at least 256 network nodes. By using overhead bytes as extended APS node IDs, large single ring SONET/SDH systems can be avoided. This means APS messages that force every node into a single ring can be avoided and recovery performance from a break in the ring or a node fault can be improved. The protocol for the extended automatic protection switching channels takes multiple extended APS node IDs from tributary lines and merges those extended APS ID's into a single SONET/SDH stream on another line. Placement of the extended APS node ID's in the overhead bytes of SONET/SDH frames allows easy relay around each SONET/SDH ring.

14 Claims, 3 Drawing Sheets

MULTIPLEXED AUTOMATIC PROTECTION SWITCHING CHANNELS

FIELD OF THE INVENTION

The present invention relates to telecommunications in general, and, more particularly, to telecommunications networks that use an automatic protection switching (APS) protocol.

BACKGROUND OF THE INVENTION

SONET/SDH systems have been built and used for a number of years. Although differences exist between SONET and SDH, those differences are mostly in terminology. In most respects, the two standards are the same and virtually all equipment that complies with either the SONET standard or the SDH standard also complies with the other. Therefore, for the purposes of this specification, the SONET standard and the SDH standard shall be considered interchangeable and the acronym/initialism "SONET/SDH" shall be defined as either the Synchronous Optical Network standard or the Synchronous Digital Hierarchy standard, or both.

The basic SONET/SDH signal is defined as a Synchronous Transport Signal level 1 (STS-1). An STS-1 frame is an 810-byte data packet comprising transport overhead (the information required to maintain communication) and payload (the data itself).

SONET/SDH systems come in many different configurations, but frequently form a network of SONET/SDH nodes connected by links in a closed loop, known in the art as a "ring." In a ring network, there are two paths between any pair of nodes, one transporting communications signals clockwise and the other counterclockwise.

To protect communications signals from link failures, SONET/SDH rings use one of these two paths as the service, or working, connection and bandwidth is reserved along the other path as a backup (known in the art as a "protection channel"). When a break or fault occurs in a link, a message is sent out requesting protection switching around the break or fault to maintain communications. The request message is communicated by means of an automatic protection switching (APS) channel which uses a two-byte field, in which the two bytes are referred to as K1 and K2, located within the transport overhead of a frame. This ability to rapidly respond with automatic protection switching around breaks and/or faults has made SONET/SDH systems very popular.

Traditional SONET/SDH systems use the STS-1 line overhead to communicate bytes K1 and K2, which are used for indicating a requested source node address and a selected adjacent destination node address as two ends of the protection switching path that is used to bypass any breaks or faults in a corresponding 'working-ring-segment' between those two nodes. The request message is usually followed by a command to switch the data traffic to a protection switching path that is predetermined as per BellCORE generic requirement, GR-1230, which is hereby incorporated by reference. BellCORE GR-1230 concerns SONET/SDH systems that have bi-directional line switched rings (BLSR) and defines the use of bytes K1 and K2 of STS-1 section/line overhead for identifying a protection switching path. GR-1230 requires that the source node and the destination node of a protection switching path around a break or a fault be identified in bytes K1 and K2 in an APS message in BLSR SONET/SDH systems.

The GR-1230 APS channel format for bytes K1 and K2 is as follows:

K1 Byte:
  Bits 1–4: Type of request (e.g., Lock out of Protection, Forced Switch—Span, Forced Switch—Ring, Signal Fail—Span, Signal Fail—Ring, Signal Degrade—Protection, Signal Degrade—Span, Signal Degrade—Ring, Manual Switch—Span, Manual Switch—Ring, etc.)
  Bits 5–8: Destination Node ID (Address)
K2 Byte:
  Bits 1–4: Source Node ID (Address)
  Bit 5: Indication of architecture (Short Path or Long Path)
  Bits 6–8: Mode of operation (Line AIS-L, Line RDI-L, Extra Traffic, Bridged and Switched Status, Bridged Status and Idle).

Bytes K1 and K2 are used for APS channel signaling between line terminating entities for bi-directional protection switching and for detecting alarm indication signal (AIS-L) and Remote Defect Indication (RDI) signals.

In a BLSR SONET/SDH system, bytes K1 and K2 provide the only APS signaling channel. Bits 5–8 of byte K1 indicate destination node ID and bits 1–4 of byte K2 indicate source node ID. As can be readily appreciated, with only four bits available for specifying a node ID, a typical SONET/SDH system can only support up to sixteen nodes for a ring using standard protocol.

Furthermore, bytes K1 and K2 do not support more complex networks than rings (e.g., rings within rings, virtual rings, etc.). This shortcoming exists because the one APS channel and the sixteen nodes maximum are closely tied to the physical working ring and to the physical nodes of the ring.

Thus, it is desirable to provide a SONET/SDH system comprising multiple APS channels. It is also desirable to have a SONET/SDH system that is not limited to a maximum of sixteen nodes. It yet further desirable to provide a SONET/SDH system participating in multiple rings, whether the rings are real or virtual, with multiple APS channels and having a capability to address more than sixteen nodes per ring.

SUMMARY OF THE INVENTION

The aforementioned shortcomings in the art are addressed and a technological advance is achieved by providing a SONET/SDH system in which overhead bytes other than K1 and K2 carry additional protection switching ("APS") node IDs. These additional APS node IDs are used to provide multiple multiplexed APS channels instead of the single unmultiplexed APS channel of the generic standard. The multiple multiplexed APS channels support more complex network arrangements, such as virtual rings and also rings within rings, which were previously not available through the use of the generic standard. The additional APS node IDs also help support more complex network arrangements.

The aforementioned shortcomings in the art are addressed and a technological advance is achieved by providing a SONET/SDH APS message that includes: a first group of bits designating one of a first group of APS nodes as a source node for fault condition operation of a first ring, and a second group of bits designating one of the first group of APS nodes as a destination node of the first ring for fault condition operation. The first group of bits and the second group of bits are located within a common line overhead of one SONET/SDH frame. Also included in the APS message are a third group of bits designating one of a second group of APS nodes as a source node of a second ring for fault condition operation, and a fourth group of bits designating one of the second group of APS nodes as a destination node of the second ring for fault condition operation. The third group of bits and the fourth group of bits are located in line overhead bytes of the same SONET/SDH frame at distinct bit locations than the first group of bits and the second group of bits.

The aforementioned shortcomings in the art are addressed and a technological advance is achieved by providing an apparatus for automatic protection switching in a SONET/SDH system having at least one ring, including a network element of the ring time-multiplexing frames between a slower downstream link and a faster upstream link by terminating the downstream frames and generating upstream frames with corresponding information for transmission on the faster link. The network element addresses nodes of the ring by four address bits as defined by GR-1230 and a group of extended address bits for representing automatic protection switching node addresses in support of protection switching on the slower downstream link. The network element also addresses nodes of the ring by four address bits as defined by GR-1230, and by a group of extended address bits for representing automatic protection switching node addresses on the faster upstream link. Thus, extended APS node signaling is communicated from a lower speed link to a higher speed link by the network element and the extended APS addresses are carried in line overhead bytes of a SONET/SDH frame.

DETAILED DESCRIPTION

Figure 1:
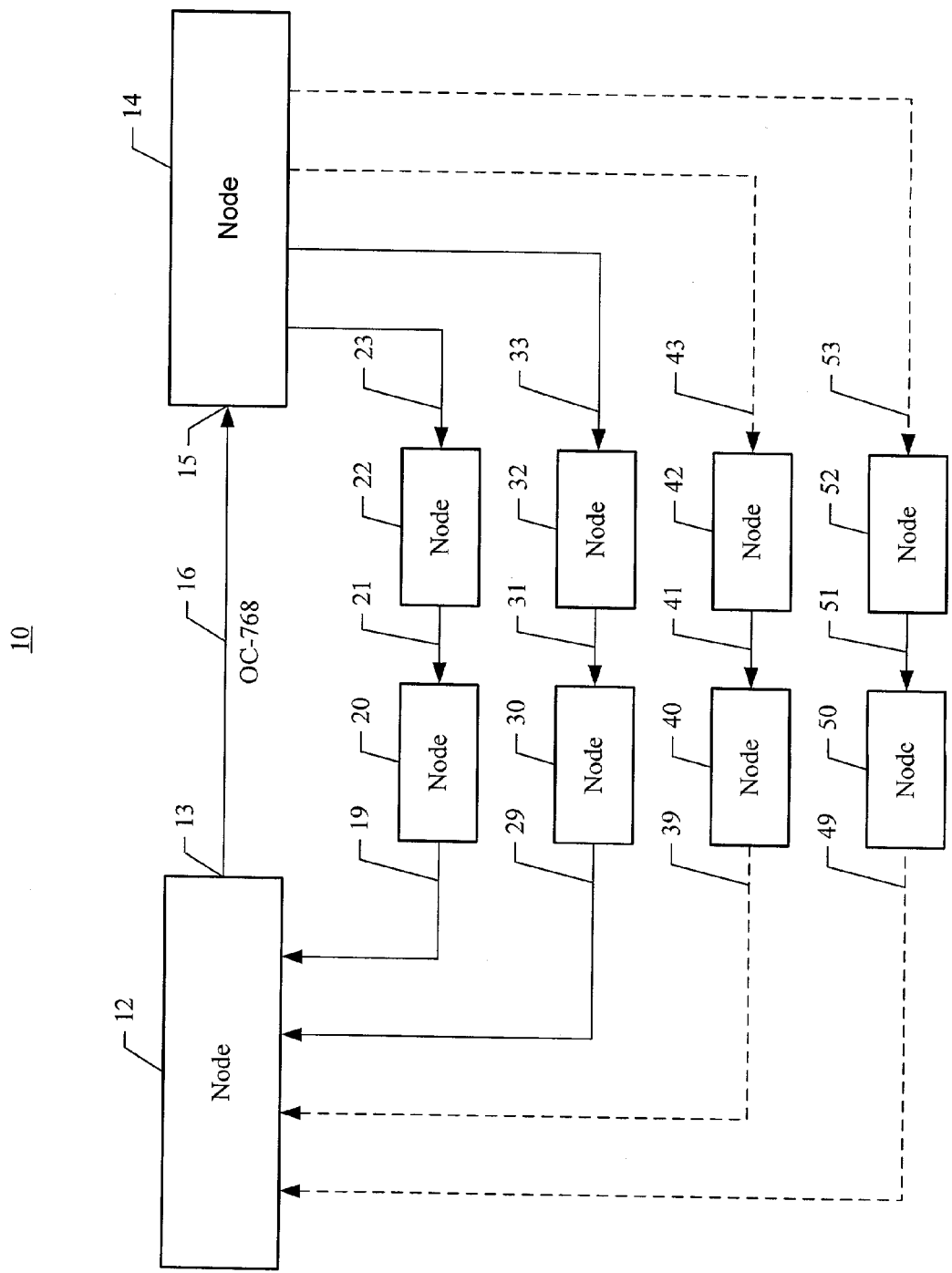
FIG. 1 is a simplified block diagram of two entities that are connected by representative networks.

Referring now to FIG. 1, telecommunications system 10 comprises network element 12 that is connected to another network element, network element 14, by link 16. Two rings are shown, and two more are partially shown. In this way, there are four rings and link 16 is part of each ring. In FIG. 1, link 16 is optical and has a data rate of 40 gigabits-per-second (i.e., OC-768). Arrows in FIG. 1 indicate one direction around the ring, the clockwise direction, provides a normal flow of data, and the counterclockwise direction provides protection around a fault. However, since the invention envisions an extension of a BLSR SONET/SDH system, the links can be bidirectional. For example, if link 19 breaks, any traffic on link 19 is rerouted on links 21, 23, and 16. A feature of the present invention is that the same link 16 will also be part of the reroute if say link 29 were to break. Thus, link 16 and its operation will be an important part of this description.

Node 12 and 14 are SONET/SDH-like nodes connected to link 16 at high speed nodes 13 and 15. Node 12 and 14 are referred to as SONET/SDH-like because they use a different type of APS protocol than the GR-1230 APS protocol. GR-1230 uses the line overhead of STS-1 specified by the SONET/SDH standards. Node 12 and 14 are operating with a new APS protocol, according to an exemplary embodiment of this invention, that is a superset of the GR-1230 requirements. Also connected to node 12 and 14 are rings OC-m-1, OC-m-1–2, through OC-m-4. Ring OC-m-1 is shown connected with network element 12, optical line 19, network element 20, optical line 21, network element 22, optical line 23 and network element 14. Ring OC-m-2 is shown connected with network element 12, optical line 29, network element 30, optical line 31, network element 32, optical line 33 and network element 14. Ring OC-m-3 is shown, in part, connected with network element 12, optical line 39, optical line 43, and network element 14. OC-m-4 is shown, in part, connected with network element 12, optical line 49, optical line 53, and network element 14. The intervening topology for OC-m-3 and OC-m-4 is inconsequential, as long as the total node count is less than the maximum addressing capacity of the new APS protocol or the total bandwidth (including OC-m-1 and OC-m-2) is not more than that of link 16 (i.e., 40 gigabits per second if link 16 is OC-768 or equivalent). Link 16 is part of the four rings OC-m-1 to OC-m-4. It is worth noting that if a ring has more than 16 nodes, then all the node in that ring must be extended SONET/SDH elements. On the other hand, for a ring that has 16 or fewer nodes, only node 12 and 14 need to be extended SONET/SDH.

Telecommunications system 10 shown in FIG. 1 has one high-speed, wide bandwidth link 16 carrying data from multiple tributary rings. FIG. 1, among other things, illustrates one way to upgrade a portion of a SONET/SDH system that has reached either fiber or bandwidth exhaustion. The upgrading of two node 12 and 14, and of link 16 leads to an interconnecting of slower data rate lines and node, thereby forming structures known as meshes. Without the multiple APS channels provided by the present invention, multiple rings could not be handled as individual entities; rather, all of the system rings would have to be folded into one large "ring". With such a large single ring, any fault on any one of the links or node would cause a serious slowdown in APS channel traffic performance, which could affect telecommunications system 10 entirely. Such a slowdown could increase the recovery time of telecommunications system 10. The ability to work in large networks without forcing the operation of the APS channel as if it belonged to a single large ring is one of the advantages of the present invention. As will be seen, that ability comes in part by extending BLSR SONET/SDH to include multiple APS channels.

The implementation and operation of additional APS nodes is provided by extending the GR-1230 SONET/SDH APS protocol according to the multiple APS channel protocol of a preferred embodiment of the present invention. That protocol for byte 1, byte 2 and byte 3 within each of extended APS channel 2, extended APS channel 3 and extended APS channel 4 signaling is given immediately below.

Byte 1:

Each of byte D4, byte D7, and byte D10 is byte 1 of extended APS channel 2, extended APS channel 3 and extended APS channel 4, respectively.

Bits 5–8 provide extended destination node identifications (IDs), and bits 1–4 provide extended source node IDs.

Byte 2:

Each of byte D5, byte D8 and byte D11 is byte 2 of extended APS channel 2, extended APS channel 3 and extended APS channel 4, respectively.

Bits 1–8 provide the same bit coding as the coding of byte K1 of the standard APS channel 1.

Byte 3:

Each of byte D6, byte D9 and byte D12 is byte 3 of extended APS channel 2, extended APS channel 3 and extended APS channel 4, respectively.

Bits 1–8 provide the same bit coding as the coding of byte K2 of standard APS channel 1.

Per SONET/SDH standards, the nine bytes D4 through D12 are allocated for line data communications. Typically, these bytes are used for alarms, maintenance, control, monitoring, administration and other communication needs between line terminating entities.

APS channel 1 has the same signaling protocol as the standard GR-1230 K1/K2 coding. APS channel 2, APS channel 3 and APS channel 4 use extended APS channel protocol. Because the extended APS channels use and extend the K1/K2 coding of GR-1230, that extended coding is hereinafter referred to as "K1/K2/K3." K1/K2/K3 refers to the coding of the bits, not the positions of the K1 and K2 bytes in a frame. Since Byte 2 corresponds to K1 coding and Byte 3 corresponds to K2 coding, Byte 1 logically corresponds to K3.

An alternative embodiment of the present invention uses bytes Z1-Z2-E2 of the line overhead, instead of bytes D4 through D12 or in addition to bytes D4 through D12. Bytes Z1-Z2-E2 are also identified in SONET/SDH standards. The addition of using bytes Z1-Z2-E2 would provide for an extended APS channel 5. The four-bit (i.e., bits 5–8) extended destination node ID along with the four request bits coding of K1 (i.e., K1 bits 1–4) form an extended destination node ID. Similarly, the four-bit (i.e., bits 1–4) extended source node ID along with the four select bits coding of K2 (i.e., K2 bits 5–8) form an extended source node ID. Together, the extended APS IDs provide a possible 256-node capability in the preferred embodiment. The 256-node ID capability is a needed extension to the way standard GR-1230 uses source node IDs and destination node IDs.

Figure 2:
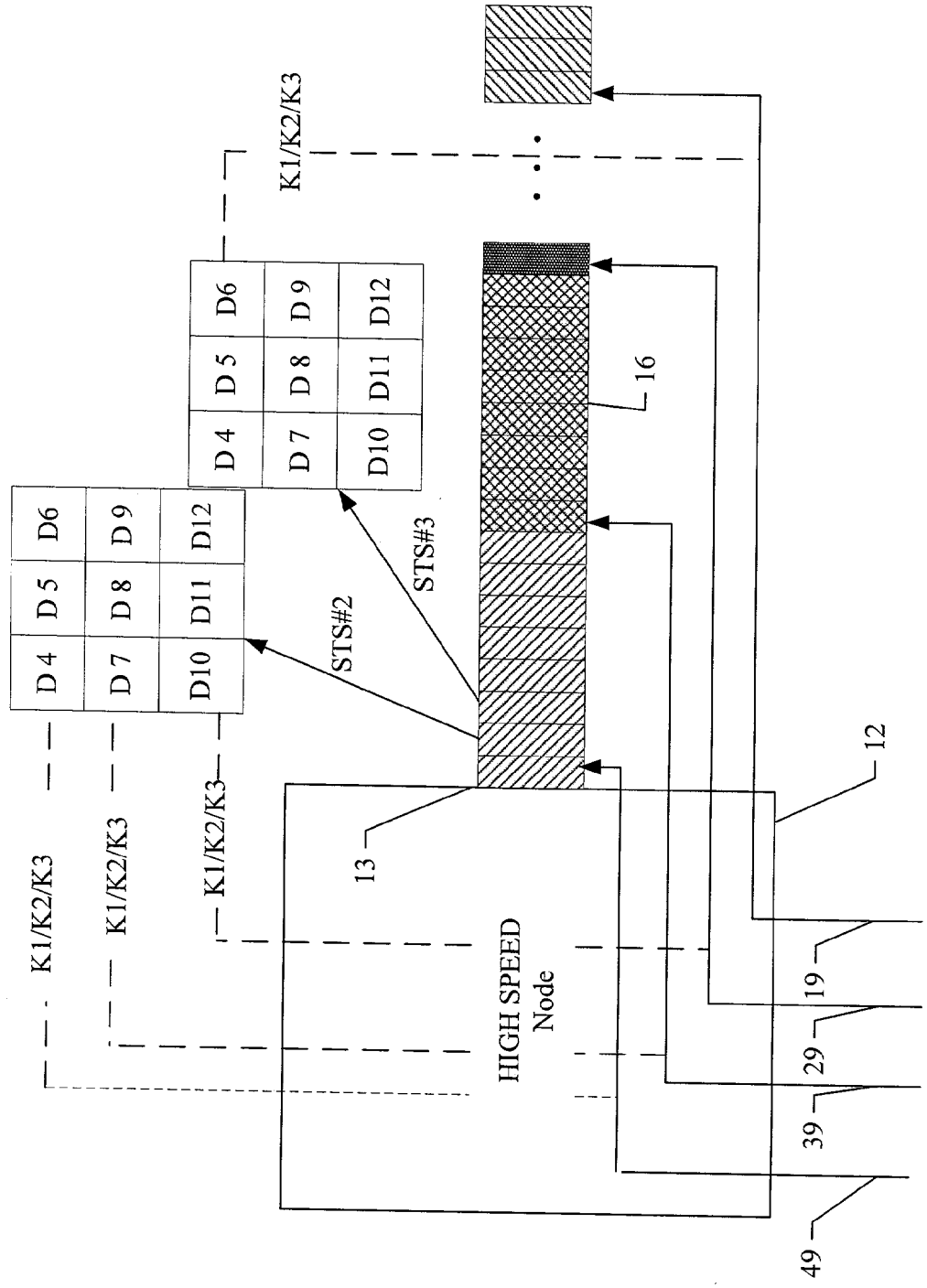
FIG. 2 illustrates how multiple APS channels are distributed while multiplexing lower speed Optical Channel (OC) ring nodes to a higher speed link supporting multiple rings simultaneously.

Referring now to FIG. 2, one embodiment of a left-hand portion of FIG. 1 is illustrated. Network element 12 is shown connected over link 16, which in this embodiment is an OC-768. Network element 12 is also connected over lower speed links 19, 29, 39 and 49, which in the embodiment of FIG. 2 are OC-48 links. Network element 12 manages the connections to links 19, 29, 39 and 49, as well as the connection to link 16, as "ring" connections as far as the extended APS channel protocol is concerned. Data from link 19 travels into and out of network element 12 and into and out of link 16. The last portion of data associated with link 19 is located as indicated by the arrowhead associated with link 19. Data from link 29 travels into and out of network element 12 and into and out of link 16. The last portion of the data associated with link 29 is located as indicated by the arrowhead associated with link 29. Data from link 39 travels into and out of network element 12 and into and out of link 16. The last portion of the data associated with link 39 is located as indicated by the arrowhead associated with link 39. Data from link 49 travels into and out of network element 12 and into and out of link 16. The last portion of data associated with link 49 is located as indicated by the arrowhead associated with link 49. As mentioned previously, data is organized as frames having 90-byte columns by 9 rows. The frames include an overhead, 87 bytes of which are moved as shown and 3 bytes of which are terminated by network element 12. Also, for the purposes of simplifying the illustration and description, FIG. 2 does not show any data traffic that is being added or dropped at the node of network element 12.

The traffic on link 16 from links 19, 29, 39 and 49 are respectively represented by lower left to upper right hatching; heavily hatched hatching; light cross hatching, and upper left to lower right hatching. As shown in FIG. 2 by the dashed lines and by arrows to bit maps of portions of the line overhead, the extended APS channels are provided by STS-2 line overhead bytes D4-D5-D6; D7-D8-D9; and D10-D11-D12 and by STS-3 line overhead bytes D4-D5-D6. Thus, in this embodiment, four extended APS channels are provided so four rings can have extended APS channels, with each ring having up to 256 node IDs. Further, the extended APS channel protocol multiplexes the four extended APS channels from links 19, 29, 39 and 49 into a single SONET/SDH data stream on link 16. This multiplexing is provided by network element 12 by terminating the K1/K2/K3 bytes coming in on link 19, for example, and regenerating the information from K1/K2/K3 to bytes D10, D11 and D12 of link 16. It is important to note that link 19 and the portion of link 16 carrying the K1/K2/K3 data on bytes D10, D11 and D12 are parts of the same ring.

Because there are three extended APS channels per line overhead and four incoming data streams, the fourth extended APS channel is moved to D4-D5-D6 of STS-3. If another three bytes in each line overhead could be used for APS channels, such as Z1-Z2-E2, then only one overhead of one SONET/SDH frame rather than two would be required to manage four extended APS channels. If more rings need APS channels, the number of extended APS channels can be easily extended further by using more D4 through D12 bytes on other STSs within the extended APS channel protocol.

Figure 3:
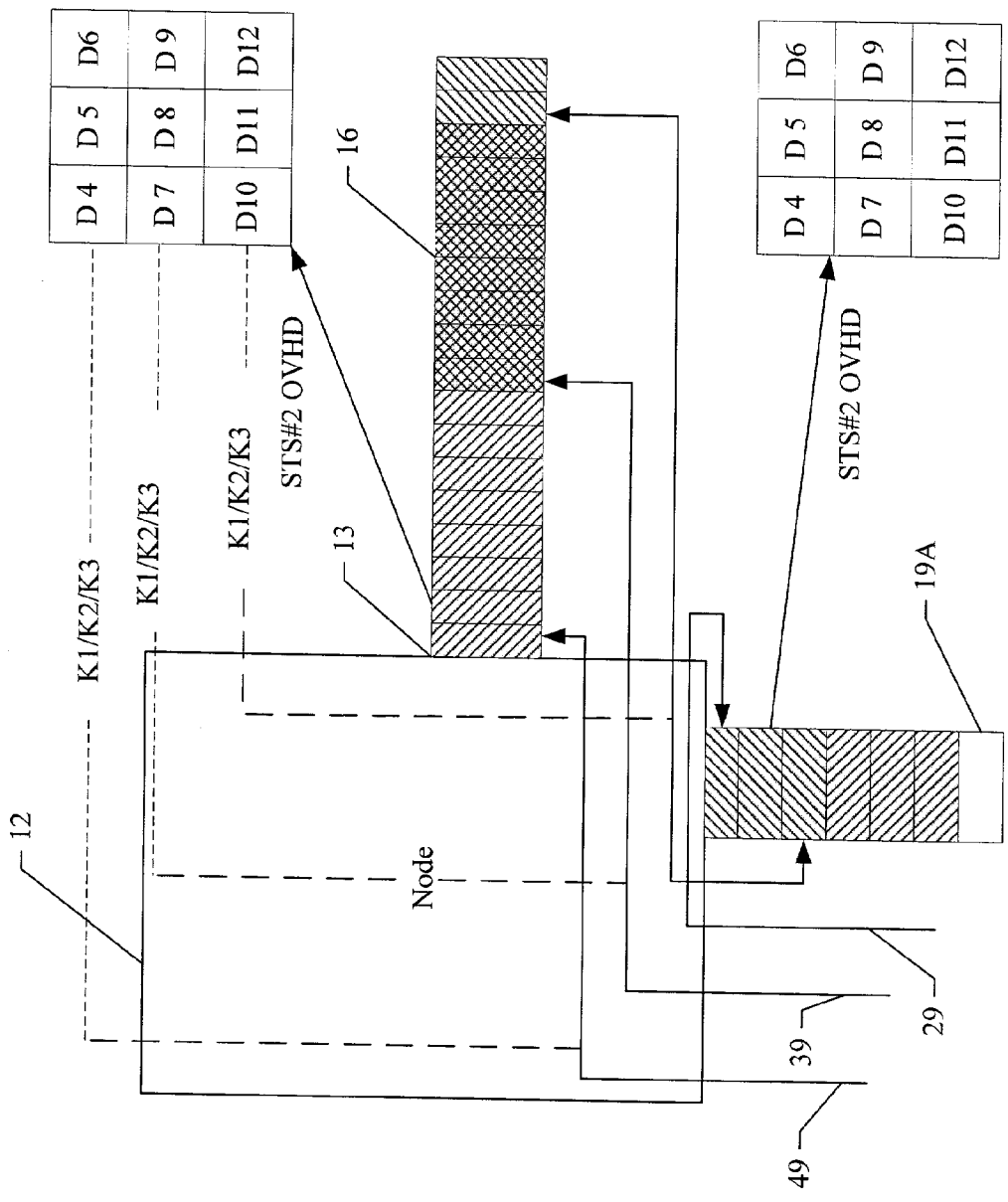
FIG. 3 illustrates how multiple APS channels are distributed while multiplexing lower speed OC ring nodes to intermediate speed OC ring nodes, intermediate speed links carrying multiple rings simultaneously and also lower and intermediate speed OC ring nodes to a higher speed OC link carrying multiple rings simultaneously.

Referring now to FIG. 3, another embodiment of the present invention is illustrated. Network element 12 is connected to OC-48 links 49, 39 and 29. Network element 12 is also connected to OC-192 link 19A and OC-768 link 16. Link 49 and link 39 are multiplexed in network element 12 onto link 16 into a single SONET/SDH stream on an OC-768. Extended APS channels are used to provide the automatic protection switching features available in this extension of SONET/SDH APS protocol. In FIG. 3, three extended APS channels are represented by line overhead bytes D4-D5-D6; D7-D8-D9; and D10-D11-D12 of STS-2 on the link 16. These extended APS channels provide automatic protection switching for SONET/SDH rings. These rings include a first ring containing link 49 and parts of link 16, second ring containing link 39 and parts of link 16, and a third ring containing link 19A and parts link of 16. As shown in FIG. 3, only part of the payload of link 19A is part of the third ring. Other extended APS channels are represented by line overhead bytes D4-D5-D6 and D7-D8-D9 of STS-2 on link 19A. An extended APS channel for the ring containing link 29 is provided by D4-D5-D6 line overhead bytes of STS-2 of link 19A. An extended APS channel of link 19A is provided by D7-D8-D9 line overhead bytes of STS-2 of link 19A and by D10-D11-D12 line overhead bytes of STS-2 of link 16, at least the portion that is part of the same ring as link 19A. In this way, a fourth ring is represented containing links 29 and part of 19A, extended APS channels for which are provided by D4-D5-D6 overhead bytes of STS-2 on link 29 and D7-D8-D9 overhead bytes of STS-2 on link 19A. For every ring (or part thereof) defined on network element 12, there exist two extended APS channels defined on two different links.

As illustrated in FIG. 3, the extended APS channel protocol provides multiple APS channels on link 16 and puts them in a single SONET/SDH data stream. Also, as in FIG. 2, the extended APS channel protocol can address 256 node IDs.

Network element 12 dynamically conserves bandwidth on the high speed link by removing frames that have already reached their desired nodes. Such frames are dropped completely without any placeholder frames being sent over link 16. This dynamic conservation helps make room on link 16 for any extra SONET/SDH frames sent along link 16 for extended APS channel signaling.

It is worth noting that for a single point of presence unit having multiple node with OC-48 and/or OC-192 rings similar to FIG. 3 in capability, those multiple node could be replaced with a single high speed network element. In such a case, each of the previous rings will behave the same and enjoy the same protection scheme as existed previously. Further, backhaul to digital cross connect systems (DCSs) that were necessary for previous APS channel protocols to share APS messages among the rings are now unnecessary. Such backhaul DCSs are avoided by the extended APS channel protocol according to the present invention. Thus, the resulting network has a lot less equipment, a lot less floor space and power required, and no need to route traffic to DCSs.

It is to be understood that the above-described embodiments are merely illustrative of the present invention and that many variations of the above-described embodiments can be devised by those skilled in the art without departing from the scope of the invention. For example, the bytes D4 through D12 could be from a line overhead of any SONET/SDH frame instead of STS-2 and STS-3 as described above. It is therefore intended that such variations be included within the scope of the following claims and their equivalents.

What is claimed is:

1. A method for providing automatic protection switching (APS) in a SONET/SDH network, the method comprising:
   receiving data at a network element on a first ring link, the data received on the first ring link comprising:
   a first plurality of bits designating one of a first plurality of protection switching nodes of a first ring as a source node for a first ring fault condition;
   a second plurality of bits designating one of said first plurality of protection switching nodes of said first ring as a destination node for said first ring fault condition;
   receiving data at the network element on a second ring link, the data received on the second ring link comprising:
   a third plurality of bits designating one of a second plurality of protection switching nodes of a second ring as a source node for a second ring fault condition; and
   a fourth plurality of bits designating one of said second plurality of protection switching nodes of said second ring as a destination node for said second ring fault condition;
   generating a SONET/SDH frame at the network element using the first, second, third, and fourth plurality of bits, wherein:
   (i) said first plurality of bits and said second plurality of bits are located within line overhead bytes of the SONET/SDH frame; and
   (ii) said third plurality of bits and said fourth plurality of bits occupy different locations in said line overhead bytes of said SONET/SDH frame than do said first plurality of bits and said second plurality of bits;
   transmitting the SONET/SDH frame from the network element on a third ring link.

2. The method of claim 1 wherein:
   said first plurality of bits is located in line overhead byte K2 of said SONET/SDH frame; and
   said second plurality of bits is located in line overhead byte K1 of said SONET/SDH frame.

3. The method of claim 2 wherein:
   said third plurality of bits is located in line overhead bytes D4-D5-D6 of said SONET/SDH frame; and
   said fourth plurality of bits occupies different locations in line overhead bytes D4-D5-D6 of said SONET/SDH frame than does said third plurality of bits.

4. The method of claim 1 wherein:
   said third plurality of bits is located in line overhead bytes D4-D5-D6 of said SONET/SDII frame; and
   said fourth plurality of bits occupies different locations in line overhead bytes D4-D5-D6 of said SONET/SDH frame than does said third plurality of bits.

5. The method of claim 4 further comprising:
   receiving data at the network element on a third ring link, the data received on the third ring link comprising:
   a fifth plurality of bits designating one of a third plurality of protection switching nodes of a third ring as said source node for a third ring fault condition; and
   a sixth plurality of bits selecting one of said third plurality of protection switching nodes of said third ring as said destination node for said third ring fault condition,
   wherein the SONET/SDH frame is generated using the fifth and sixth plurality of bits in addition to the first, second, third, and fourth plurality of bits,
   wherein said fifth plurality of bits and said sixth plurality of bits occupy different locations in line overhead bytes of said SONET/SDH frame than do said first plurality of bits, said second plurality of bits, said third plurality of bits, and said fourth plurality of bits.

6. The method of claim 5 wherein:
   said fifth plurality of bits is located in line overhead bytes D7-D8-D9 of said SONET/SDH frame; and
   said sixth plurality of bits occupies different locations in line overhead bytes D7-D8-D9 of said SONET/SDH frame at locations than does said fifth plurality of bits.

7. The method of claim 6 further comprising:
   receiving data at the network element on a fourth ring link, the data received on the fourth ring link comprising:
   a seventh plurality of bits designating one of a fourth plurality of protection switching nodes of a fourth ring as a source node for a fourth ring fault condition; and
   an eight plurality of bits designating one of said fourth plurality of protection switching nodes of said fourth ring as a destination node for said fourth ring fault condition;
   wherein the SONET/SDH frame is generated using the seventh and eighth plurality of bits in addition to the first, second, third, fourth, fifth, and sixth plurality of bits,
   wherein said seventh plurality of bits and said eighth plurality of bits occupy different locations in line overhead bytes of said SONET/SDH frame than do said first plurality of bits, said second plurality of bits, said third plurality of bits, said fourth plurality of bits, said fifth plurality of bits, and said sixth plurality of bits.

8. The method of claim 7 wherein:
   said seventh plurality of bits is located in line overhead bytes D10-D11-D12 of said SONET/SDH frame; and said eighth plurality of bits occupies different locations in line overhead bytes D10-D11-D12 of said SONET/SDH frame than does said seventh plurality of bits.

9. The method of claim 1 wherein:
said first plurality of bits is located in line overhead bytes D4-D5-D6 of said SONET/SDH frame; and
said second plurality of bits occupies different locations in line overhead byte D4-D5-D6 than does said first plurality of bits.

10. The method of claim 9 wherein:
said third plurality of bits is located in line overhead bytes D7-D8-D9 of said SONET/SDH frame; and
said fourth plurality of bits occupies different locations in line overhead bytes D7-D8-D9 of said SONET/SDH frame than does said third plurality of bits.

11. The method of claim 10 further comprising:
receiving data at the network element on a third ring link, the data received on the third ring link comprising:
a fifth plurality of bits for designating one of a third plurality of protection switching nodes of a third ring as a source node during a third ring fault condition; and
a sixth plurality of bits for designating one of said third plurality of protection switching nodes of said third ring as a destination node during said third ring fault condition,
wherein the SONET/SDH frame is generated using the fifth and sixth plurality of bits in addition to the first, second, third, and fourth plurality of bits;
wherein said fifth plurality of bits and said sixth plurality of bits occupy different locations in line overhead bytes of said SONET/SDH frame than do said first plurality of bits, said second plurality of bits, said third plurality of bits, and said fourth plurality of bits.

12. The method of claim 11 wherein:
said fifth plurality of bits is located in line overhead bytes D10-D11-D12 of said SONET/SDH frame; and
said sixth plurality of bits occupies different locations in line overhead bytes D10-D11-D12 of said SONET/SDH frame than does said fifth plurality of bits.

13. The method of claim 12 further comprising:
receiving data at the network element on a fourth ring link, the data received on the fourth ring link comprising:
a seventh plurality of bits designating one of a fourth plurality of protection switching nodes of a fourth ring as a source node during a fourth ring fault condition; and
an eighth plurality of bits designating one of said fourth plurality of protection switching nodes of said fourth ring as a destination node during said fourth ring fault condition,
wherein the SONET/SDH frame is generated using the seventh and eighth plurality of bits in addition to the first, second, third, fourth, fifth, and sixth plurality of bits,
wherein said seventh plurality of bits and said eighth plurality of bits occupy different locations in line overhead bytes of said SONET/SDH frame than do said first plurality of bits, said second plurality of bits, said third plurality of bits, said fourth plurality of bits, said fifth plurality of bits, and said sixth plurality of bits.

14. The method of claim 13 wherein:
said seventh plurality of bits is located in line overhead bytes Z1-Z2-E2 of said SONET/SDH frame; and
said eighth plurality of bits occupies different locations in line overhead bytes Z1-Z2-E2 of said SONET/SDH frame than does said seventh plurality of bits.

* * * * *